United States Patent [19]
Gallios et al.

[11] Patent Number: 4,566,059
[45] Date of Patent: Jan. 21, 1986

[54] CONVERTER WITH LOSSLESS SNUBBING COMPONENTS

[75] Inventors: George C. Gallios, Setauket; Derek Whitehead, Locust Valley; Richard Seleski, Huntington Station, all of N.Y.

[73] Assignee: Venus Scientific Inc., Farmingdale, N.Y.

[21] Appl. No.: 516,146

[22] Filed: Jul. 21, 1983

[51] Int. Cl.[4] ............................................. H02M 3/335
[52] U.S. Cl. ......................................... 363/17; 363/98; 363/56; 363/132
[58] Field of Search ................ 307/261, 262, 270, 282, 307/412, 543; 363/17, 56, 98, 132

[56] References Cited

U.S. PATENT DOCUMENTS

| | | | |
|---|---|---|---|
| 4,213,082 | 7/1980 | Wisner et al. | 363/53 |
| 4,276,588 | 6/1981 | McLyman et al. | 363/56 |
| 4,403,269 | 9/1983 | Carroll | 363/56 |
| 4,471,196 | 9/1984 | Frank et al. | 363/98 |

FOREIGN PATENT DOCUMENTS

| | | | |
|---|---|---|---|
| 0079130 | 5/1983 | European Pat. Off. | |
| 1118346 | 11/1961 | Fed. Rep. of Germany | 363/53 |

*Primary Examiner*—William H. Beha, Jr.
*Assistant Examiner*—Jeffrey Sterrett
*Attorney, Agent, or Firm*—Ostrolenk, Faber, Gerb & Soffen

[57] ABSTRACT

The inverter includes a DC to AC converter circuit including a plurality of transistors which are switched on and off to convert a DC signal into an AC signal. The converter circuit also includes diodes which are alternately forward and reverse biased during the operation of the converter circuit, the diode having a reverse recovery period whenever the diode is switched from a forward to a reverse biased condition during which the reverse resistance of the diode is substantially zero. An inductor is connected to the diode for limiting the current through the diode during the reverse recovery period such that shoot through currents which pass through both the diode and the inductor are limited to desired levels.

25 Claims, 8 Drawing Figures

CONVERTER WITH LOSSLESS SNUBBING COMPONENTS

BACKGROUND OF THE INVENTION

1. Field of the Invention

The present invention is directed towards a converter having lossless snubbing components including inductors which minimize "shoot through" currents which would occur due to the reverse recovery time of diodes used in the converter and which also include elements for recovering the power stored in the anti-shoot through inductors. In the presently preferred embodiment, the invention is used in connection with a DC to DC resonant current driven regulator. The invention can be used, however, in connection with more conventional voltage driven or current driven converters.

2. Description of the Prior Art

The present invention is particularly useful in connection with the current drive resonant converter of copending application Ser. No. 417,465, filed Sept. 13, 1982 now U.S. Pat. No. 4,475,149, issued Oct. 2, 1984. The disclosure of this application is incorporated herein by reference.

Figure 1A:
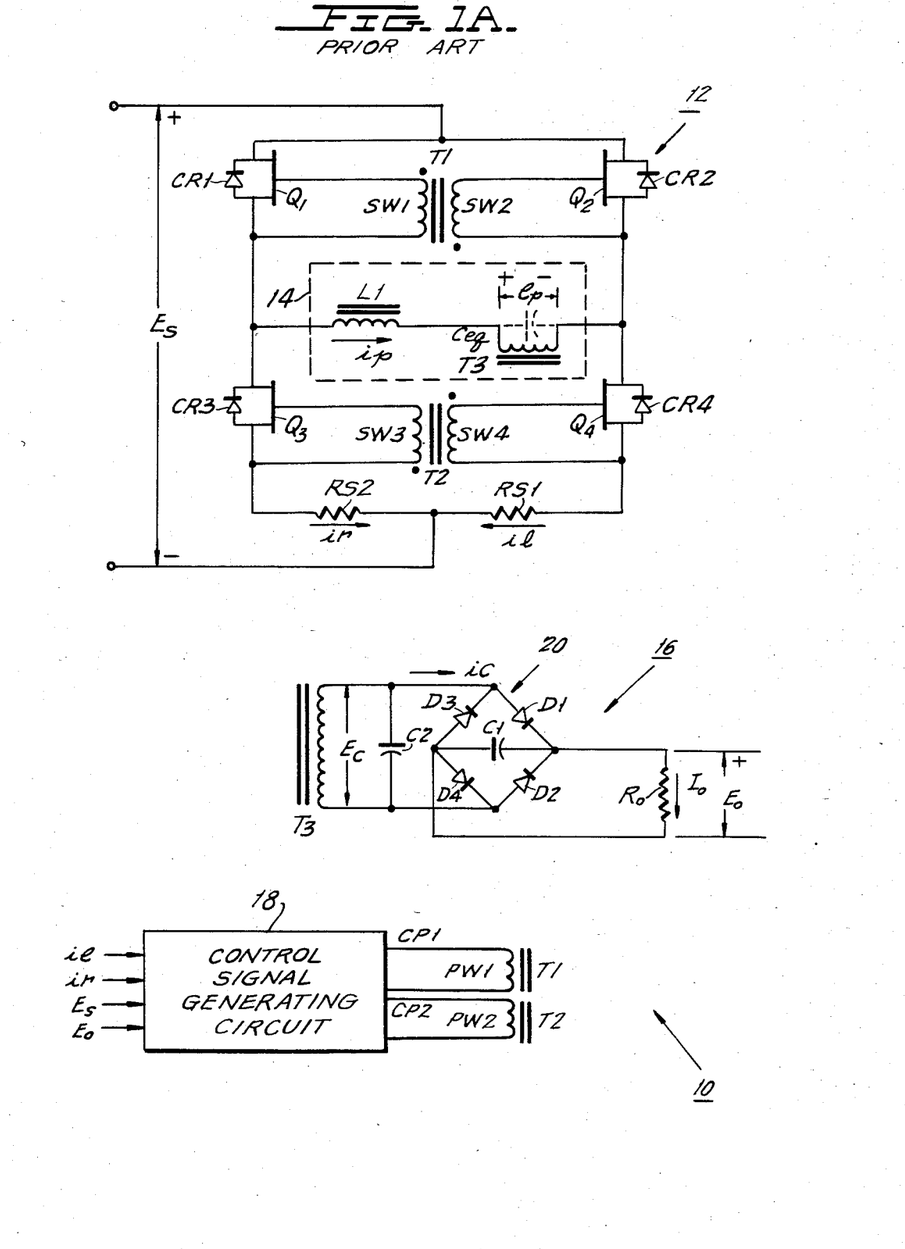
FIG. 1A is a circuit diagram of a resonant current driven DC/DC converter regulator with which the present invention is particularly useful.
Figure 1B:
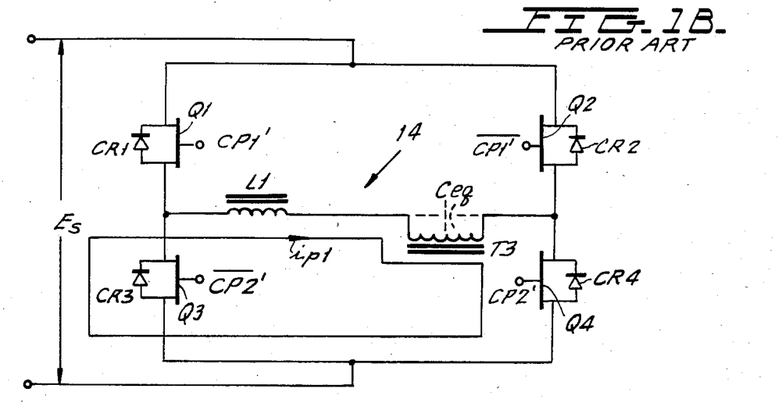
FIGS. 1B–1D are circuit diagrams of the input portion of the circuit of FIG. 1A and illustrates the current flow through the circuit during various portions of the transistor switching cycle.
Figure 1C:
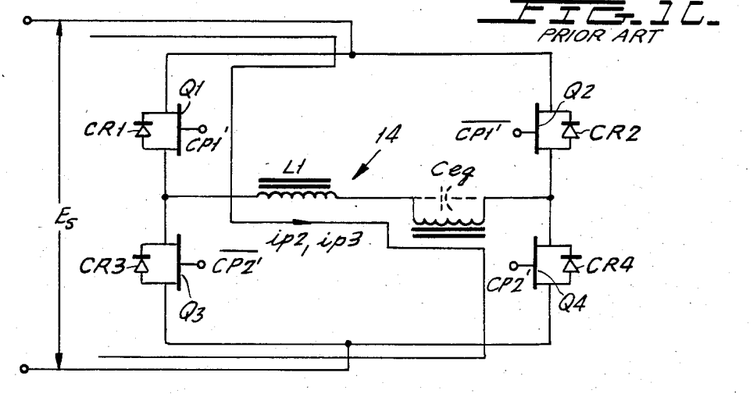
Figure 1D:
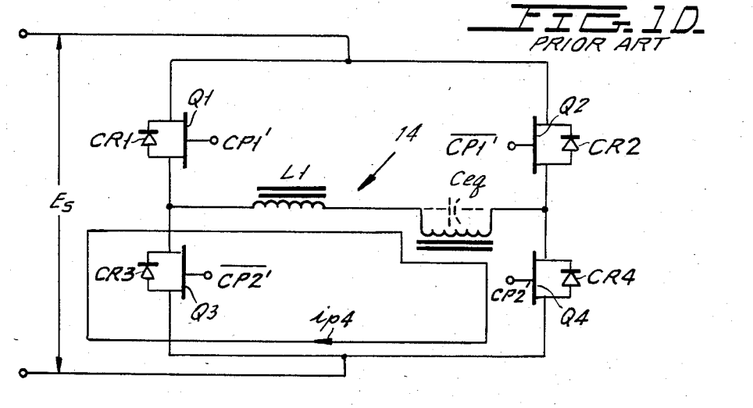

The preferred structure of the resonant current driven DC/DC converter regulator of the foregoing invention is illustrated in FIG. 1A. As shown therein, the resonator 10 includes an input inverter circuit 12 which converts a DC input signal Es into an AC signal, an LC circuit 14 across which the a.c. signal is applied, and an output circuit 16 which converts the AC voltage appearing across the primary winding W1 of transformer T3 into a DC voltage Eo. While the input inverter circuit may take any form, it preferably includes four high-speed mosfet transistors Q1–Q4, each of which inherently includes a respective substrate diode CR1–CR4 across its drain end source.

The switching operation of transistors Q1–Q4 is controlled by a control signal generating circuit 18 whose structure is illustrated in detail in copending application Ser. No. 417,465. It is sufficient to note that the control signal generating circuit generates control signals CP1, CP2 which are applied to the primary windings of transformers T1 and T2, respectively, and control the operation of transistors Q1–Q4.

Figure 2:
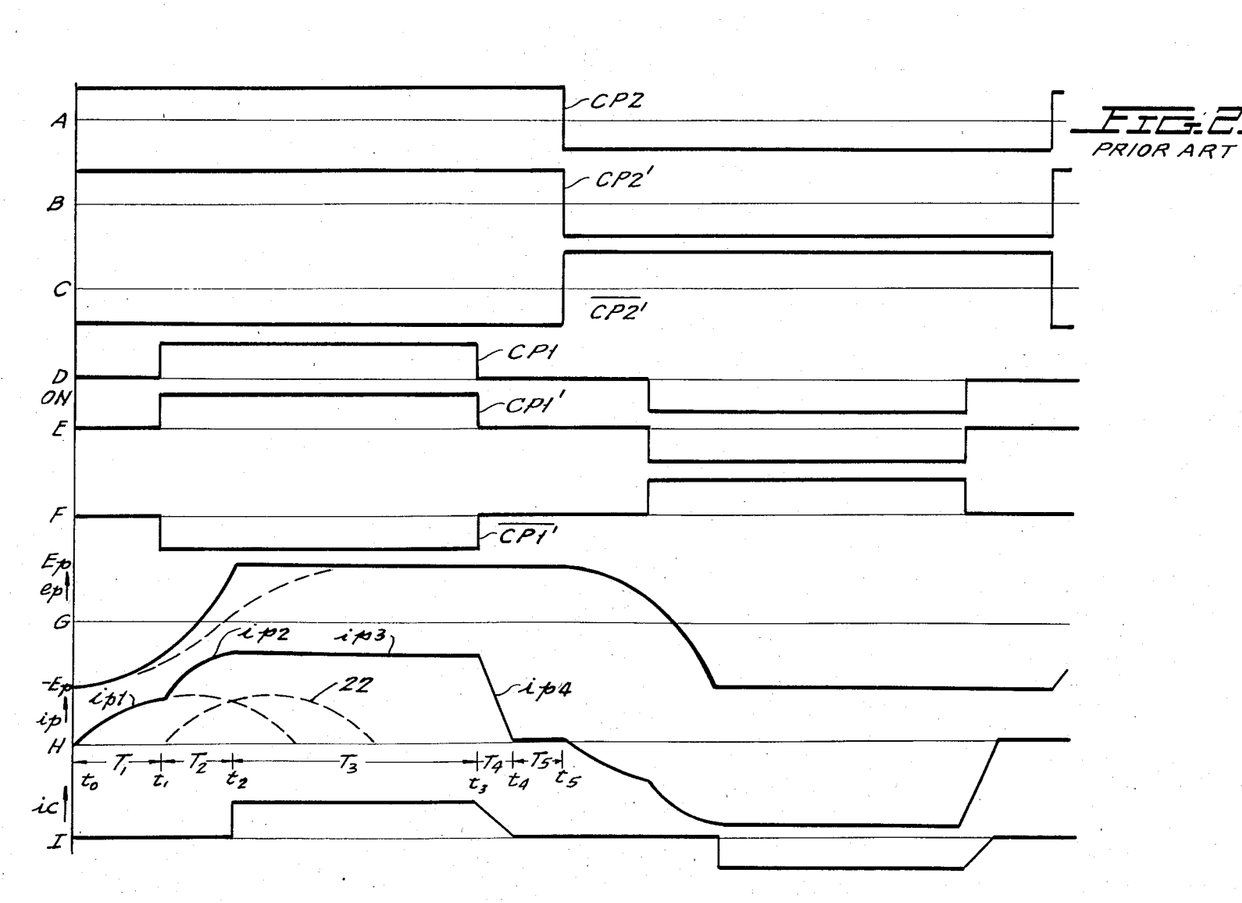
FIG. 2 is a graph illustrating a series of waveforms on a common time line, which waveforms are used to describe the operation of the circuit of FIG. 1A.

The control signals CP1, CP2 take the form illustrated in lines D and A, respectively, of FIG. 2. As shown therein, control signal CP2 is a square wave having a period Ts and a frequency fs=1/Ts. This frequency is the switching frequency of transistors Q3 and Q4 and define the frequency of the a.c. waveform appearing across the primary winding of transformer T3.

The control signal CP2 is applied to the primary winding PW2 of transformer T2 and induces control signals CP2' and CP2' in the secondary windings SW3 and SW4, respectively, of transofrmer T2. These signals are applied to the respective gates of transistors Q3 and Q4 and turn these transistors on during alternate half periods of the switching cycle.

Figure 4:
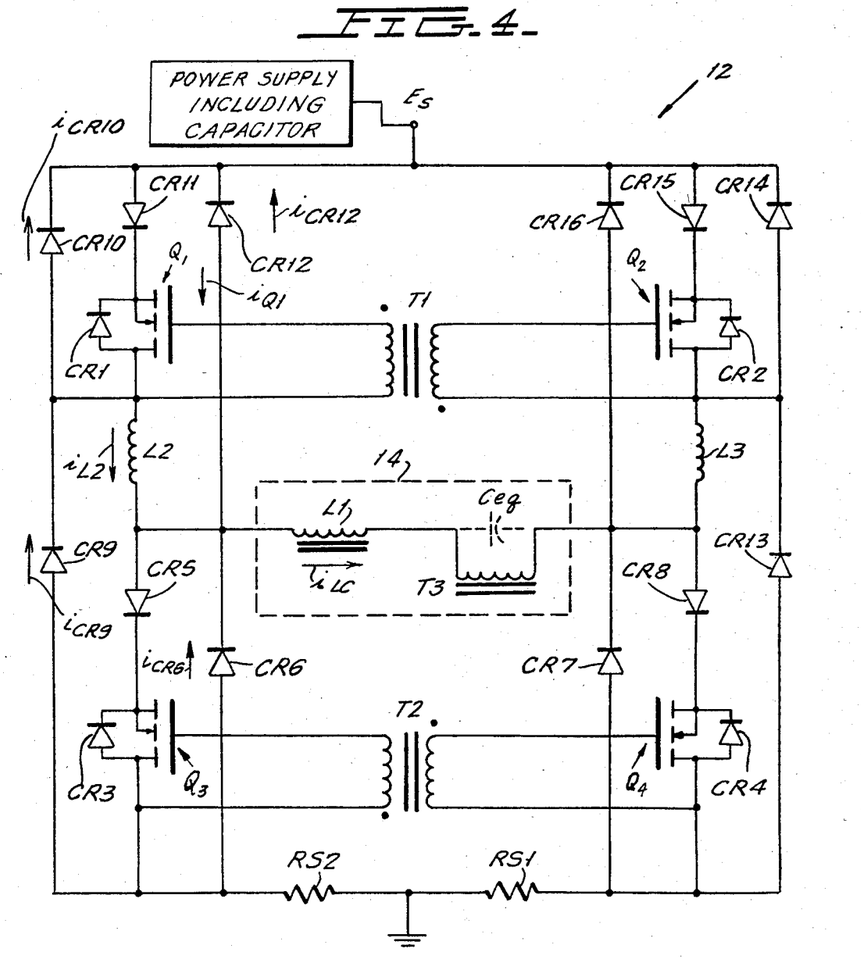
FIG. 4 is a circuit diagram of a resonant current driven DC/DC converter regulator incorporating the circuitry of the present invention.

The control signal CP1 takes the general form illustrated in line D of FIG. 4 and includes a positive going pulse during a portion of the first half of each period Ts and a negative going pulse during a portion of the second half of each period Ts. As will be explained in greater detail below, the duration and position with respect to control signal CP2 of each positive and negative going pulse of the control signal CP1 is varied by the control circuit 18 to regulate the magnitude of the output voltage Eo. The control signal CP1 is applied to the primary winding PW1 of transformer T1 and induces control signals CP1' and CP1' in the secondary windings SW1, SW2, respectively, of transformer T1. These control signals are applied to respective gates of transistors Q1 and Q2 and cause transistors Q1 and Q2 to turn on during selected portions of alternating half cycles of the switching period Ts. As will be described in below, the timing of the leading and trailing edges of each pulse set CP1', CP1' controls the magnitude and duration of current pulses applied to output capacitor C1 of output circuit 16 and thereby controls the magnitude of the output voltage Eo.

LC circuit 14 defines a resonant circuit having a resonant frequency fr which is greater than the switching frequency fs defined by control signal CP2. The resonant frequency fr is preferably approximately 2½ times the switching frequency fs and may be defined as:

$$fr = \frac{1}{2\sqrt{L1\ Ceq}} \qquad \text{(Eq. 1)}$$

wherein L1 is the inductance of inductor L1 and Ceq is the capacitance of the equivalent capacitor Ceq appearing across the primary winding of transformer T3. Equivalent capacitor Ceq is defined by the stray capacitance on both the primary and secondary windings of transformer T3 and any capacitance appearing in the output circuit 16 on the transformer side of rectifier bridge 20 which is reflected back to the primary winding of transformer T3. Since the stray capacitance alone is not normally sufficiently high to cause the resonant frequency fr to reach the desired value, a capacitor C2 is placed across the secondary winding of transformer T3. This capacitor is reflected to the primary winding of transformer T3 and forms part of the equivalent capacitance Ceq. Alternatively, the capacitor C2 may be placed across the primary winding of transformer T3.

The operation of power circuit 10 can best be understood with reference to the waveforms of FIG. 2 and the circuit diagrams of FIGS. 1A–1D. At the beginning of each switching cycle (at time t0 of FIG. 2), capacitor Ceq is charged to −Ep volts where:

$$Ep = \frac{1}{N} Eo \qquad \text{(Eq. 2)}$$

and N is the turns ration of transformer T3.

During the first portion of this half cycle of the switching period Ts, the control signals CP2', CP2' are applied to respective gates of transistors Q4, Q3 thereby driving transistor Q4 into saturation and shutting transistor Q3 off. In this condition, the charge across capacitor Ceq causes a resonant current ip1 to flow through inductor L1, substrate diode CR3 and transistor Q4 in the direction shown in FIG. 1B. This resonant current flows towards a maximum value:

$$ip1_{max} = \frac{Ep}{Zo} \qquad \text{(Eq. 3)}$$

wherein Zo is the impedance of LC circuit 14 and is defined as:

$$Z_o = \sqrt{L1/Ceq} \qquad \text{(Eq. 4)}$$

The resonant current will rise toward $ip1_{max}$ at the resonant frequency fr defined in equation (1), supra. Simultaneously, the voltage across capacitor Ceq will begin rising from $-Ep$ towards $+Ep$. At time t1 (see FIG. 2), control signal CP1' is applied to the gate of transistor Q1 causing transistor Q1 to turn on. This enables the current ip2 to flow through the path illustrated in FIG. 1C and effectively adds another step function having a magnitude Es to the LC circuit 14. As a result, a second resonant current illustrated by dash lines 22 in line H of FIG. 2 will be added to the LC circuit 14. This causes the current ip2 to rise at a faster rate towards $2ip1_{max}$ and causes the voltage $e_p$ across capacitor Ceq to rise at a faster rate toward the value $2Es+Ep$. See lines G and H of FIG. 2.

At time t2, the voltage across capacitor Ceq will reach the value Ep at which diode bridge 20 turns on. Once diode bridge 20 begins conducting, the charging capacitor C1 is reflected back across the primary winding of transformer T3. Since the capacitance of capacitor C1 is substantially greater than the equivalent capacitor Ceq, substantially all of the current Ip3 through inductor L1 flows through the primary winding of transformer T3. This current will induce a charging current ic (see line I of FIG. 2) in the secondary winding of transformer T3. The charging current is applied both to the load Ro and to the charging capacitor C1. This current will be integrated by capacitor C1 and will charge capacitor C1 to the desired output value Eo.

Assuming that the source voltage Es and the output voltage Eo remain constant (except for ripple voltage) during the half period of the switching cycle, the voltage across capacitor Ceq will remain at a constant value Ep and all the energy (less circuit losses) flowing through inductor L1 will be transferred to charging capacitor C1 and the load Ro. As long as the voltage across capacitor Ceq remains at Ep and current continues to flow through inductor L1, energy will be transferred to capacitor C1.

At time t3, the control signal CP1' applied to the gate of transistor Q1 drops to 0 thereby turning transistor Q1 off. At that point, the current ip4 continues to flow through transistor Q3 and substrate diode CR4 as illustrated in FIG. 3D and in line H of FIG. 2. During this period, all of the energy in inductor L1 is transferred to the load Ro and to charging capacitor C1 at a decay rate of Ep/L1. When current ip4 reaches 0, substrate diode CR3 prevents the current ip from reversing thereby stopping the current flow. This, in turn, causes diode bridge 20 to stop conducting and the charging current ic falls to 0. See line I of FIG. 2. There is then a dead period t5 during which no current flows through inductor L1.

During this interval, the voltage across capacitor Ceq remains at Ep. This is the only energy left stored in the circuit and is used to reverse the polarity of the voltage across capacitor Ceq during the first portion of the next half cycle of the switching period Ts during which the transistor Q3 is on and the remaining transistors are off. See line G of FIG. 2. The operation of the converter circuit during the second half of each switching period Ts is identical to that of the first half of the cycle except the transistors Q2 and Q3 are turned on and the wave forms are inverted as shown in FIG. 2.

The foregoing circuit exhibits significant advantages over the prior art circuits as described in some detail in copending application Ser. No. 417,465. It does, however, exhibit one major drawback. Particularly, the foregoing description of the invention presumes that the diodes CR1-CR4 have a substantially instantaneous recovery time so that they immediately turn off once they are reverse biased. In fact, each diode has a predetermined reverse recovery time in which is presents substantially no resistance to a reverse current for a short period of time. When using the substrate diodes which are inherent in high-speed mosfet transistors, the reverse recovery time is relatively slow, in the order of 250 nanoseconds. During this recovery time, a phenomenon known as "shoot through" occurs wherein peak magnitude reverse currents are permitted to flow through the diodes. These peak reverse currents occur during the transition from current ip1 to ip2 and again during the transition from ip3 to ip4. Referring to FIG. 2, at the instant t1, transistor Q1 is turned on it places the source voltage Es across transistor Q1 and the diode CR3. Since the reverse resistance of diode CR3 is very low during the reverse recovery period of the diode, the total impedance in series with the power supply Es is very low. As a result, high peak currents are permitted to pass through transistor Q1 and diode CR3 during the recovery period. While these current spikes are of extremely short duration, they are sufficiently high that they destroy the transistors in the converter circuit.

Figure 3:
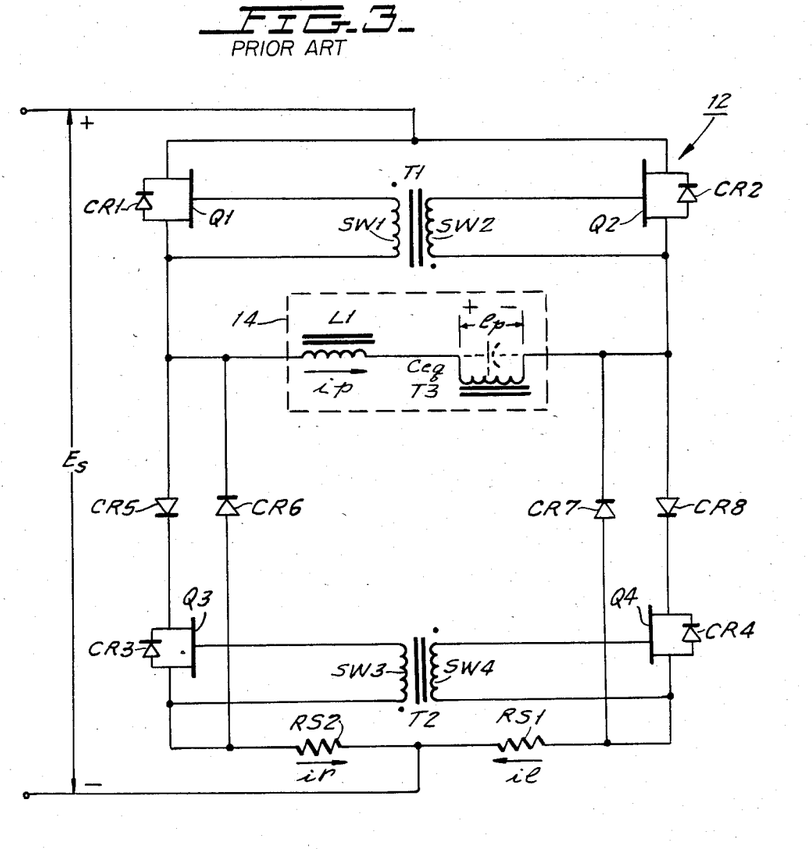
FIG. 3 is a circuit diagram of a modification of the circuit of FIG. 1A.

A conventional technique for reducing the energy content of these "shoot through" currents is to add additional fast recovery diodes which isolate the transistor body diodes from the circuit operation. See diodes CR5-CR8 of FIG. 3. Available very fast recovery diodes reduce the shoot through time to about one-fifth of that of the power mosfet substrate diodes. While this significantly reduces the amplitude and duration of the shoot through currents (a reduction from 25 to 10 amps in a typical circuit operation), these high-speed shoot through currents creats frequency components in the 1 to 1,000 MHz range. This creates undesired noise in the system and still applies undesired excess power to the transistors.

BRIEF DESCRIPTION OF THE INVENTION

In order to overcome the foregoing and other problems, the present invention utilizes a pair of anti-shoot through inductors which force the current flow through the inverter circuit 12 during transitional operation (i.e., during transition from currents ip1 to ip2 and ip3 to ip4) to vary in a controlled manner which limits the "shoot through" currents to a level sufficiently low to avoid any adverse effect on the circuit transistors and also significantly reduce the electric noise generated by the "shoot through" currents.

While the anti-shoot through inductors overcome the foregoing problems, they store excess electrical energy which is normally wasted and reduces the efficiency of the converter circuit. For this reason, the invention preferably includes additional fast recovery diodes which direct this energy either into the load or back into the power circuit which preferably contains its own capacitors and can store this excess energy. This results in a significant increase the efficiency of the system. Utilizing these components, the present invention has reduced peak currents in a 500 watt version of the resonant current driven converter from a peak in the order of 20 amperes to less than one ampere while at the same time significantly increasing the efficiency of the system and reducing the noise levels thereof.

In accordance with the foregoing, the present invention comprises:

a DC to AC converter circuit including a plurality of transistors which are switched on and off to convert a DC signal into an AC signal, said converter circuit including a diode which is alternatively forward and reverse biased during the operation of said converter circuit, said diode having a reverse recovery period whenever said diode is switched from a forward to a reversed biased condition during which the reverse resistance of said diode is substantially zero; and an inductor connected to said diode for limiting the current through said diode during said reverse recovery period such that shoot through currents which pass through said diode are limited to desired levels.

The invention preferably also comprises fast recovery diodes which direct excess energy stored in the inductor into the load or back into the source of DC voltage.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

DETAILED DESCRIPTION OF THE PREFERRED EMBODIMENT

FIG. 4 illustrates the presently preferred manner in which the lossless snubbing components of the present invention are utilized to modify the converter regulator of U.S. Pat. No. 4,475,149. The converter regulator of FIG. 4 includes an output circuit 16 and a control signal generating circuit 18 which are not illustrated in the Figure but are identical to circuits 16 and 18 of FIG. 1A. As shown therein, the lossless snubbing components of the present invention include inductors L2 and L3 (connected in series between transistors Q1, Q3 and Q2, Q4, respectively) and fast recovery diodes CR5 through CR16. In order to remove the adverse effects of the slow recovery time of substrate diodes CR1–CR4, diodes CR5 and CR6 are provided to block the forward current flow through substrate diode CR3 of transistor Q3, diodes CR7, CR8 are provided to block the forward current through substrate diode CR4, diodes CR10, CR11 are provided to block the forward current through substrate diode CR1 and diodes CR14, CR15 are provided to block the forward current through substrate diode CR2. While this reduces the effect of shoot through currents, they are still sufficiently large to damage the circuit components and also create unwanted noise. To solve this problem, the invention provides anti-shoot through inductors L2 and L3. These inductors are selected to slow current transients to a sufficient degree to provide sufficient time for transistors Q1 and Q2 to turn on during their respective half cycles of the resonant cycle before any substantial current passes through the transistors and also to ensure that there are no significant reverse recovery current spikes through transistors Q1–Q4 due to the reverse recovery of diode CR6 and CR7, respectively.

Diodes CR10, CR12, CR14 and CR16 serve to discharge excess energy stored in inductors L2 and L3 as a result of the minor shoot through currents which remain in the circuit. Particularly, the diodes CR12 and CR16 serve to direct excess energy in inductors L2 and L3 due to the reverse recovery of diodes CR6 and CR7, respectively, back into the input capacitor circuit of the power source and the diodes CR10 and CR14 serve to direct excess energy in inductors L2 and L3 due to the reverse recovery of diodes CR9 and CR13, respectively, back into the power source (20). The power source preferably includes storage capacitors which can store this excess energy.

Figure 5:
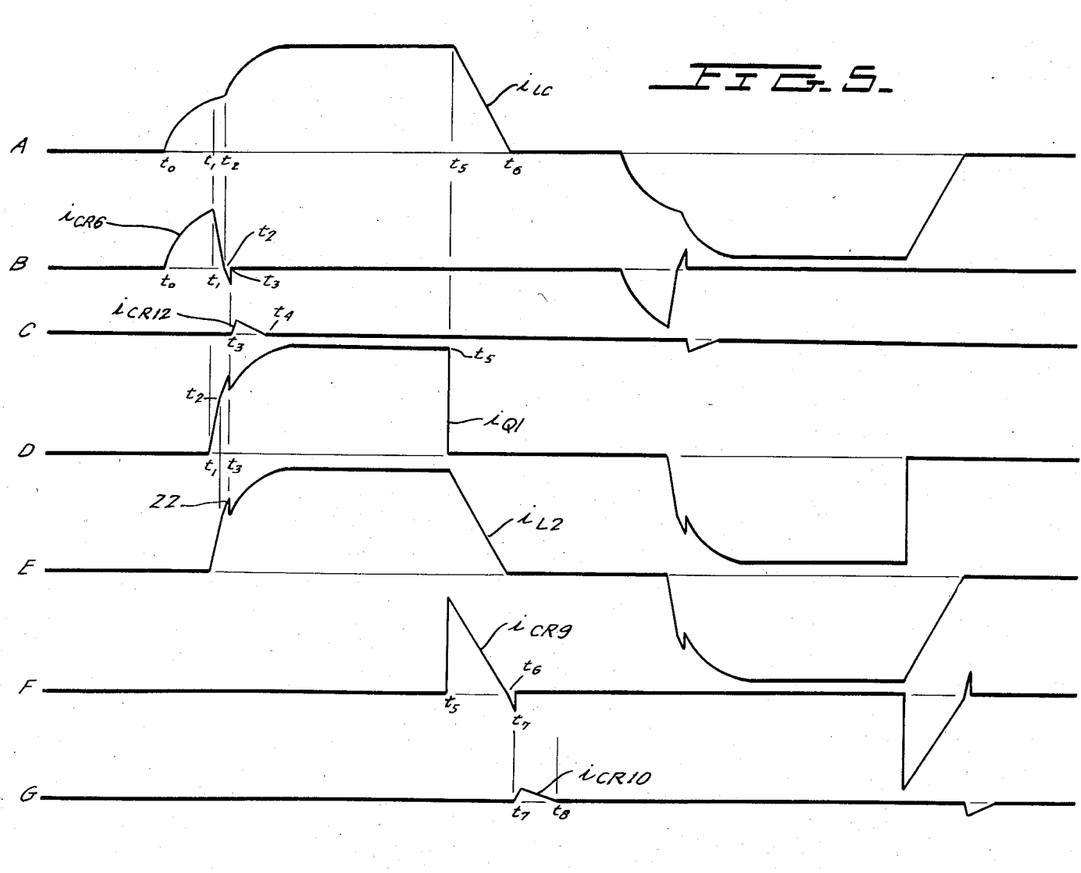
FIG. 5 is a graph illustrating a series of waveforms on a common time line, which waveforms are used to described the operation of the circuit of FIG. 4.

The operation of the circuit of FIG. 4 can best be understood with reference to the timing diagram of FIG. 5. In FIG. 5, the waveforms corresponding to lines A–G of FIG. 2 are omitted since they are substantially identical to that illustrated in FIG. 2. Line A of FIG. 5 illustrates the waveform of the current $i_{LC}$ through the LC circuit 14. At time t0, transistor Q4 is turned on and the current $i_{LC}$ begins flowing from left to right through the LC circuit 14. This current rises in a sinusoidal manner. At time t1, transistor Q1 is turned on. No additional current is initially supplied to the LC circuit 14 since the inductor L2 initially prevents any flow of current through Q1. During the period of time from t1 to t2, inductor L2 begins conducting and the current flowing through transistor Q1 replaces the current which had been previously flowing through diode CR6. Compare lines B and D of FIG. 5. The inductance of inductor L2 is chosen to provide sufficient time (e.g., 100 nanoseconds) for transistor Q1 to turn on before any significant current flows through the transistor and for diode CR6 to reverse recover with no significant reverse recovery current spike. As shown in line B of FIG. 5, a minor reverse current will flow through diode CR6 between time interval t2 and t3. During the time period t2–t3, inductor L2 conducts sufficient current to meet both the requirements of the LC circuit 14 (as defined by the load Ro) and the reverse current requirements of diode CR6. See the bump 22 in current $i_{L2}$ of line E of FIG. 5. At time t3, diode CR6 abruptly recovers and turns off. Since the current through inductor L2 cannot change instantaneously, some means must be provided for dissipating this current. To this end, a diode CR12 conducts this additional current back into the power supply Es which normally contains capacitors which can store this additional power. As shown in line C of FIG. 5, this additional current stops flowing at time t4.

At time t5, transistor Q1 is turned off causing the current $i_{LC}$ to decay linearly to the 0 level at time t6. Since transistor Q1 is no longer conducting (see line D of FIG. 5), and since the current across inductor L2 cannot change abruptly, an additional current path must be provided to dissipate this current. To this end, the diode CR9 is provided. As shown in line F of FIG. 5, the current through CR9 decays from its maximum value to 0 amps at time t6. During this time interval, the excess energy which had been stored in inductor L2 is transferred to the output circuit 16.

Due to the reverse recovery time of diode CR9, a small shoot through current passes through diode CR9 between times t6 and t7. During this time period, inductor L2 conducts sufficient current to meet both the requirements of the LC circuit 14 and the reverse current requirements of diode CR9. At time t7, diode CR9 abruptly recovers and turns off. Since the current through inductor L2 cannot change instantaneously, some means must be provided for dissipating this current or it could damage the transistors Q1 or Q3. To this end, a diode CR10 conducts this additional current back into the power supply Es where it is stored in the power supply capacitors. As shown in line G of FIG. 5, this current stops at time t8. This is the completion of the first half cycle of the resonant frequency. The operation of the circuit during the second half of the cycle is identical to that of the first half of the cycle with inductor L3 serving the same purpose as inductor L2 and diodes CR7, CR13, CR14 and CR16 serving the same purpose as diodes CR6, CR9, CR10 and CR12, respectively.

Summarizing the foregoing, the lossless snubbing components of the present invention reduce shoot through current spikes to a sufficient level to ensure that they will not damage the transistors of the convert circuit, significantly reduce electrical noise generated by the shoot through current spikes, and increase the efficiency of the circuit. While the invention has been described with reference to the converter regulator of copending application Ser. No. 417,465, it will be recognized by those skilled in the art that the invention is more generally applicable to more conventional voltage driven and current driven converters such as those illustrated in FIGS. 1 and 2 of copending application Ser. No. 417,465.

The present invention may be embodied in other specific forms without departing from the spirit or essential attributes thereof and, accordingly, reference should be made to the appended claims, rather than to the foregoing specification as indicating the scope of the invention.

What is claimed is:
1. A power converter, comprising:
   a DC to AC converter circuit including a plurality of transistors which are switched on and off to convert a DC signal into an AC signal, said converter circuit including a diode which is alternatively forward and reverse biased during the operation of said converter circuit, said diode having a reverse recovery period whenever said diode is switched from a forward to a reverse biased condition during which the reverse resistance of said diode is substantially zero;
   an inductor connected to said diode for limiting the current through said diode during said reverse recovery period such that shoot through currents pass through said diode are limited to desired levels; and
   an output circuit for applying the output of said DC to AC converter circuit to a load; and
   means for discharging excess power stored in said inductor due to shoot through currents into said output circuit once said diode has completed said reverse recovery period.

2. The power converter of claim 1, wherein at least one of said transistors is a MOSFET and said diode is the substrate diode extending between a source and drain of said MOSFET such that said diode is reverse biased when said MOSFET is turned on.

3. The power converter of claim 2, wherein said inductor has a value which ensures that said MOSFET is totally turned on before any substantial current passes through said MOSFET.

4. The power converter of claim 1, wherein said diode is a first diode, and wherein said discharging means includes a second diode which is normally reverse biased and which is forward biased by current flowing through said inductor at the end of said reverse recovery period of said first diode.

5. The power converter of claim 4, wherein said second diode also has a reverse recovery period whenever it is switched from a forward to a reverse biased condition during which its reverse resistance is substantially zero, and wherein said second diode is coupled to said inductor in such a manner that said inductor also limits the current through said second diode during said reverse recovery period of said second diode to desired levels.

6. The power converter of claim 5, further including:
   a power source supplying said DC signal, said power source including at least one storage capacitor; and
   second discharging means for discharging excess power stored in said inductor due to said shoot through current through said second diode and said inductor into said power source.

7. The power converter of claim 6, wherein said second discharging means includes a third diode connecting said inductor to said power source.

8. A power converter, comprising:
   a DC to AC converter circuit including a plurality of transistors which are switched on and off to convert a DC signal into an AC signal, said converter circuit including a diode which is alternatively forward and reverse biased during the operation of said converter circuit, said diode having a reverse recovery period whenever said diode is switched from a forward to a reverse biased condition during which the reverse resistance of said diode is substantially zero;
   an inductor connected to said diode for limiting the current through said diode during said reverse recovery period, such that shoot through currents which pass through said diode are limited to desired levels;
   a power source supplying said DC signal, said power source including at least one storage capacitor; and
   discharge means for discharging excess power stored in said inductor due to said shoot through currents into said power source.

9. The power converter of claim 8, wherein said discharging means includes a diode connecting said inductor to said power source.

10. The power converter of claim 8, wherein at least one of said transistors is a MOSFET and said diode is the substrate diode extending between a source and drain of said MOSFET such that said diode is reverse biased when said MOSFET is turned on.

11. The power converter of claim 10, wherein said inductor has a value which ensures that said MOSFET is totally turned on before any substantial current passes through said MOSFET.

12. A DC/DC converter regulator, comprising:
an LC circuit including a first inductor and a capacitor electrically coupled to one another;
an inverter circuit including a plurality of transistors for converting an input DC voltage into an AC voltage having substantially no DC components, said input inverter circuit applying said AC voltage across said LC circuit in a manner which causes said inductor and capacitor to resonate with one another whereby an AC voltage appears across said capacitor, said input inverter circuit also including at least one diode which is alternatively forward and reverse biased during the operation of said converter, said diode having a reverse recovery period whenever said diode is switched from a forward to a reverse biased condition during which the reverse resistance of said diode is substantially zero;
a second inductor connected to said diode for limiting the current through said diode during reverse recovery period such that shoot through currents which pass through both said diode and said second inductor are limited to desired levels;
an output circuit for converting said AC voltage appearing across said capacitor into a DC output voltage; and
means for discharging excess power stored in said inductor due to said shoot through currents into said output circuit once said diode has completed said reverse recovery period.

13. The DC/DC converter regulator of claim 12, wherein said AC voltage across said LC circuit causes current pulses of opposite polarity to flow through said first inductor during respective half cycles of said AC voltage and wherein energy is transferred to said capacitor during that portion of each half cycle of said AC voltage during which said rectifier circuit is not conducting and is transferred to said output load during that portion of each half cycle of said AC voltage during which said rectifier circuit is conducting.

14. The DC/DC converter regulator of claim 13, wherein said input inverter circuit varies the magnitude and duration of said current pulses so as to control the magnitude of said output voltage.

15. The DC/DC converter regulator of claim 12, wherein said output circuit includes a rectifier circuit located between said capacitor and an output load and wherein said rectifier circuit conducts and transfers energy from said LC circuit to said output load only when the voltage across said capacitor is greater than a value determined by the output voltage across said output load.

16. The DC/DC converter of claim 12 further including:
a power source supplying said DC voltage, said power source including at least one storage capacitor;
second discharging means for discharging excess power stored in said inductor due to said shoot through current through said second diode and said second inductor into said power source.

17. A DC/DC converter regulator, comprising:
an LC circuit including a first inductor and a capacitor electrically coupled to one another;
an inverter circuit including a plurality of transistors for converting an input DC voltage into an AC voltage having substantially no DC components, said input inverter circuit applying said AC voltage across said LC circuit in a manner which causes said inductor and capacitor to resonate with one another whereby an AC voltage appears across said capacitor, said input inverter circuit also including at least one diode which is alternatively forward and reverse biased during the operation of said converter, said diode having a reverse recovery period whenever said diode is switched from a forward to a reverse biased condition during which the reverse resistance of said diode is substantially zero;
a second inductor connected to said diode for limiting the current through said diode during said reverse recovery period such that shoot through currents which pass through both said diode and said inductor are limited to desired levels;
an output circuit for converting said AC voltage appearing across said capacitor into a DC output voltage;
a power source supplying said DC voltage, said power source including at least one storage capacitor; and
discharging means for discharging excess power stored in said inductor due to said shoot through currents through said second diode and said inductor into said power source.

18. A DC/DC converter regulator, comprising:
an LC circuit including a first inductor and a capacitor electrically coupled to one another;
an input inverter circuit including a transistor bridge and a control circuit for controlling the operation of the transistors in said bridge so as to convert an input DC voltage into an AC voltage appearing across opposite nodes of said bridge and having substantially no DC components, said input inverter circuit applying said AC voltage across said LC circuit in a manner which causes said inductor and capacitor to resonate with one another whereby an AC voltage appears across said capacitor, said input inverter circuit also including first and second diodes connected in parallel with first and second transistors of said transistor bridge, each of said first and second transistors being turned on during respective alternate half cycles of said AC voltage, said first and second diodes conducting when said first and second transistors, respectively, are not conducting, each of said diodes having a reverse recovery period whenever it is switched from a forward to a reverse biased condition during which the reverse resistance of said diode is substantially zero;
second and third inductors connected to said first and second diodes, respectively, for limiting the current through said first and second diodes, respectively, during said reverse recovery period of said first and second diodes, respectively;
an output circuit for converting said AC voltage appearing across said capacitor into a DC output voltage; and
means for discharging excess power stored in said second and third inductors due to said shoot through currents through said first and second diodes into said output circuit once said first and second diodes, respectively, have completed their reverse recovery period.

19. The DC/DC converter regulator of claim 18, wherein said first and second discharging means include third and fourth diodes, respectively, which are normally reverse biased and which are forward biased by current flowing through said second and third inductors at the end of said reverse recovery period of said first and second diodes, respectively.

20. The DC/DC converter regulator of claim 19, wherein each of said third and fourth diodes has a reverse recovery period whenever it is switched from a forward to a reverse biased condition during which its reverse resistance is substantially zero, and wherein said third and fourth diodes are coupled to said second and third inductors in such a manner that said second and third inductors also limit the current through both said second and third inductors and said third and fourth diode during the reverse recovery period of said third and fourth diodes, respectively.

21. The DC/DC converter regulator of claim 20, further including:
a power source supplying said DC signal, said power including at least one storage capacitor; and
third and fourth discharging means for discharging excess power stored in said second and third inductors due to said shoot through currents through said third and fourth diodes, respectively, into said power source.

22. The DC/DC converter regulator of claim 21, wherein said third and fourth discharging means include fifth and sixth diodes connected said second and third inductors, respectively, to said power source.

23. The DC/DC converter regulator of claim 18, wherein:
said first diode is coupled to a third transistor of said transistor bridge in such a manner that said first diode is reverse biased when said third transistor is turned on;
said second diode is coupled to a fourth transistor of said transistor bridge in such a manner that said second diode is reverse biased when said third transistor is turned on.

24. The DC/DC converter regulator of claim 23, wherein said first and second inductors have a value which ensure that said third and fourth transistors, respectively, are totally turned on before any additional current passes through said third and fourth transistors.

25. A DC/DC converter regulator, comprising:
an LC circuit including a first inductor and a capacitor electrically coupled to one another;
an input inverter circuit including a transistor bridge and a control circuit for controlling the operation of the transistors in said bridge so as to convert an input DC voltage into an AC voltage appearing across opposite nodes of said bridge and having substantially no DC components, said input inverter circuit applying said AC voltage across said LC circuit in a manner which causes said inductor and capacitor to resonate with one another whereby an AC voltage appears across said capacitor, said input inverter circuit also including first and second diodes connected in parallel with first and second transistors of said transistor bridge, each of said first and second transistors being turned on during respective alternate half cycles of said AC voltage, said first and second diodes conducting when said first and second transistors, respectively, are not conducting, each of said diodes having a reverse recovery period whenever it is switched from a forward to a reverse biased condition during which the reverse resistance of said diode is substantially zero;
second and third inductors connected to said first and second diodes for limiting the current through said first and second diodes during said reverse recovery period of said first and second diodes, respectively;
an output circuit for converting said AC voltage appearing across said capacitor into a DC output voltage;
a power source supplying said DC signal, said power source including at least one storage capacitor; and
third and fourth discharging means for discharging excess power stored in said second and third inductors due to said shoot through currents through said third and fourth diodes, respectively, into said power source.

* * * * *